United States Patent [19]

Porter

[11] 3,717,732
[45] Feb. 20, 1973

[54] ACCELERATION RESPONSIVE SENSOR

[75] Inventor: Glenn A. Porter, Greendale, Wis.

[73] Assignee: General Motors Corporation, Detroit, Mich.

[22] Filed: June 30, 1971

[21] Appl. No.: 158,171

[52] U.S. Cl. .................................200/61.45 M
[51] Int. Cl. .............................................H01h 35/14
[58] Field of Search ........200/61.45, 61.45 M, 61.48, 200/61.49; 280/150 AB

[56] References Cited

UNITED STATES PATENTS

| | | | |
|---|---|---|---|
| 2,311,637 | 2/1943 | Buchanan | 200/61.49 |
| 2,850,291 | 9/1958 | Ziccardi | 200/61.51 X |
| 3,281,551 | 10/1966 | Becke | 200/61.45 R |
| 3,336,045 | 8/1967 | Kobori | 200/61 X |
| 3,410,359 | 11/1968 | Mollison | 180/103 |
| 3,639,710 | 2/1972 | Haruna et al. | 200/61.48 |
| 3,647,999 | 3/1972 | Mazelsky | 200/61.45 R |
| 3,556,556 | 1/1971 | Goetz | 200/61.45 X |
| 2,802,204 | 8/1957 | Kennelly et al. | 200/61.45 M |
| 3,619,524 | 11/1971 | Gillund | 200/61.45 M |

Primary Examiner—H. O. Jones
Assistant Examiner—M. Ginsburg
Attorney—W. E. Finken et al.

[57] ABSTRACT

A sensor includes a housing and a base assembly secured thereto. The base assembly includes angularly diverging side walls and an arcuate end wall which cooperatively define a sector shaped recess. A contact member on the base assembly includes a plurality of cantilever spring fingers extending angularly to the sector recess. A pole magnet has its axis coplanar with a bisector of the recess. A resiliently deflectable rod is secured at its upper end thereof to the housing. The lower end of the rod mounts a cylindrical mass movable along a multiplicity of paths within the sector recess. The magnet normally holds the mass in tangential engagement with the side walls of the sector recess. An acceleration pulse of predetermined amplitude and time moves the mass into engagement with one or more of the contact fingers to close a circuit across a source of power, a mechanism to be actuated, the contact member, and the mass.

8 Claims, 3 Drawing Figures

PATENTED FEB 20 1973

3,717,732

INVENTOR.
Glenn A. Porter
BY
H. Furman
ATTORNEY

ACCELERATION RESPONSIVE SENSOR

This invention relates to pendulum-type sensors and more particularly to such sensors of the type including a mass supported on a deflectable member for movement between normal and actuated positions in response to acceleration pulses of predetermined amplitude and time applied to the mass.

The sensor of this invention is particularly intended for use in a vehicle body occupant restraint system. Such systems generally include a source of pressure fluid which inflates an occupant restraint cushion when given a signal by a sensor. The sensor receives acceleration pulses from the vehicle body, and, when a pulse of predetermined amplitude and time is received, the sensor signals the pressure fluid source to inflate the cushion.

One of the features of the sensor of this invention is that it includes a housing supporting one end of a horizontally deflectable vertical rod, the other end of which supports a mass movable within a sector shaped recess of a base assembly of the sensor. Another feature is that the mass is movable between a normal position, wherein the mass tangentially engages the angularly diverging side walls of the recess adjacent the distal ends thereof, and an actuated position wherein the mass engages a cantilevered spring finger contact adjacent an arcuate end wall at the proximal ends of such side walls to close a circuit across a source of power and a mechanism to be actuated. A further feature is that the mass is held in normal position by a pole magnet having its axis coplanar with the bisector of the recess. Yet another feature is that the housing is tubular and the deflectable rod supporting the mass is coaxially mounted within such housing. Yet a further feature is that the mass is cylindrical and one peripheral edge thereof slidably engages the cantilevered spring finger which extends angularly to the recess. Still another feature is that the base assembly includes a pair of circular plates of insulating material which cooperatively define the sector shaped recess. Still a further feature is that the pole magnet is cooperatively housed within semi-cylindrical embossments of the housing and a cover plate secured to the housing and securing the base assembly plates and the housing to each other.

These and other features of the sensor of this invention will be readily apparent from the following specification and drawings wherein.

Figure 1:
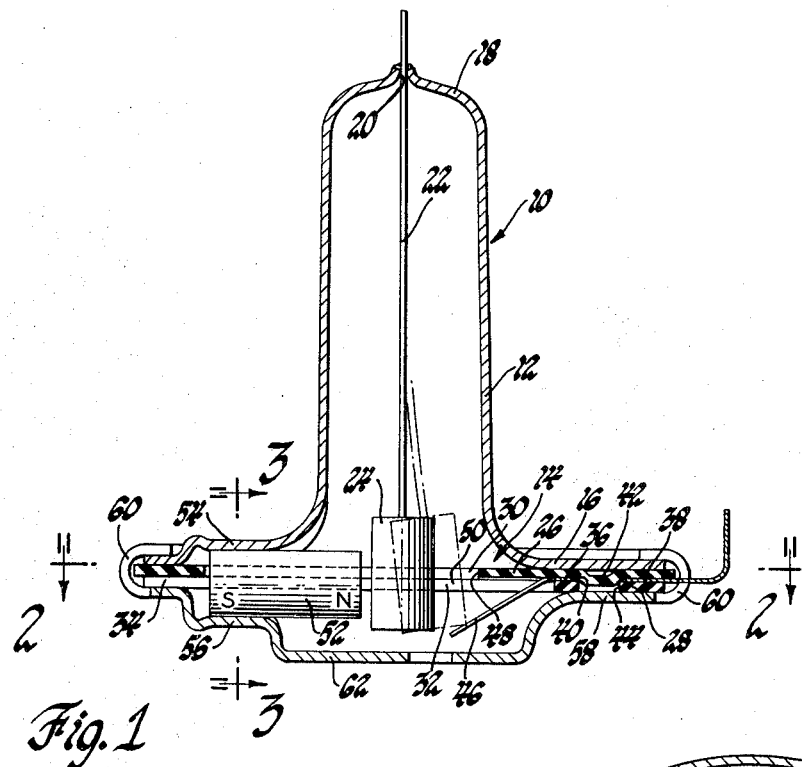
FIG. 1 is a sectional view of a sensor according to this invention with the rod and mass being shown in full lines in normal position and in phantom lines in actuated position.

Referring now to the drawings, a sensor designated generally 10 according to this invention includes a tubular housing 12 and a base assembly 14. The housing 12 includes a lower outwardly flaring circular flange 16 and an upper dome wall 18 having an upwardly flanged central aperture 20, the axis of which is coaxial with the axis of the housing. A deflectable rod 22 is received through the aperture 20 and suitably secured to the flange defining such aperture such as by welding. The lower end of the rod extends into and is secured to a cylindrical mass 24 of predetermined weight. Thus, normally, the axis of the rod 22 and of the weight 24 is coaxial with the axis of the housing 12.

The base assembly 14 includes upper and lower circular plates 26 and 28 of insulating material. Generally, the plates are of the same extent as the flange 16. The upper plate 26 includes a circular recess 30 and the lower plate 28 includes a sector shaped recess 32 which opens to a stepped radial slot 34. A spring contact 36 includes a base portion 38 provided with a pair of spaced apertures 40 which receive embossments 42 of the upper plate 26. These embossments are also received within apertures 44 of the lower plate 28 to thereby index the plates 26 and 28 with respect to each other and in turn index the contact 36 with respect to these plates. The contact 36 includes a plurality of angularly extending cantilevered spring fingers 46 which extend through the sector shaped recess 32 and past a portion 48, FIG. 2, of the circular recess 30 of the plate 26. The portion 48 of the circular recess cooperates with the side walls 50 of the recess 32 to define a sector shaped recess within which the mass 24 is movable.

A pole magnet 52 is received within the stepped radial slot 34 of plate 28 and also within cooperating semi-cylindrical embossments 54 and 56 of the flange 16 of housing 12 and a cover plate 58. The stepped slot 34 and recess 30 cooperatively locate the magnet radially with respect to plates 26 and 28. Slot 34 also locates the magnet with its axis coplanar with a bisector of the recess 32. The embossments 54 and 56 locate the magnet with respect to the plane of the recess 32 and also vertically with respect to the cover plate 58 and the housing 12. A segmented return bent flange 60 of the cover plate 58 engages the plate 28 and flange 16 to secure the base assembly 14 and the housing 12 to each other and to the plates 26 and 28. The cover plate 58 includes a central cylindrical embossment 62, FIG. 1, which provides for freedom of movement of the mass 24.

Figure 2:
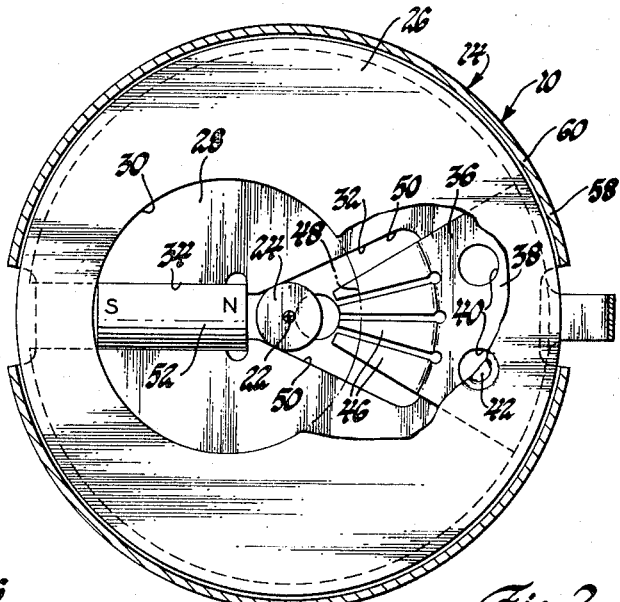
FIG. 2 is a sectional view taken generally along the plane indicated by line 2—2 of FIG. 1.
Figure 3:
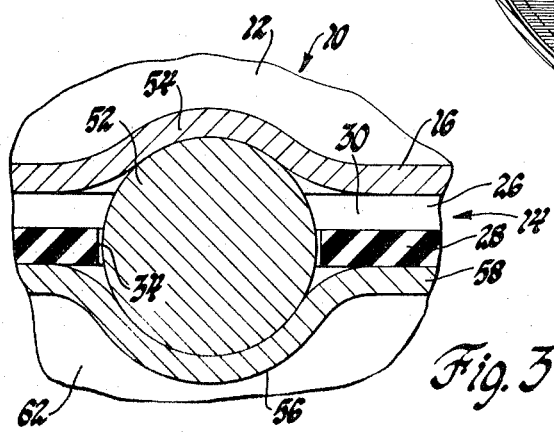
FIG. 3 is a sectional view taken generally along the plane indicated by line 3—3 of FIG. 1.

In normal position, as shown in full lines in FIG. 1 and in FIG. 2, the mass 24 is located in tangential engagement with the side walls 50 of recess 32 by the magnet 52 and the rod 22 is coaxial with the housing 12. Upon an acceleration pulse of predetermined amplitude and time being applied to the mass within a predetermined zone of response, the mass 24 moves to the right as shown in phantom lines in FIG. 1 to actuated position and engages one or more of the spring fingers 46. The engaged fingers are deflected downwardly by a peripheral edge of the mass to cushion and stop the movement thereof. The rod 22 and the contact plate 36 are connected across the source of power such that engagement of the mass and one or more of the fingers 46 completes a circuit across such source of power and a mechanism to be actuated or electrically fired by the sensor. Should the pulse be sufficiently great, the mass will engage the arcuate portion 48 of recess 30 to limit movement of the mass and avoid permanent deformation of the engaged fingers 46.

In the embodiment shown, the walls 50 of recess 32 define an included angle of 74°. This angle is less than the zone of response, 120°, of the sensor 10 and is set in a manner disclosed in copending application, Ser. No. 173,806, Sensor, Rodney A. Brooks and Vincent A. Orlando filed Aug. 23, 1971, and assigned to the assignee of this application.

Thus, this invention provides an improved sensor.

I claim:

1. A sensor comprising, in combination, a housing, a base assembly including angularly related side walls defining a sector shaped recess opening to the housing, means securing the housing and base assembly to each other, a contact member including at least one cantilever spring finger extending angularly to the recess intermediate the distal ends of the side walls, a resilient member extending through the housing, means mounting the resilient member adjacent one end thereof to the housing, a mass secured to the other end of the resilient member and having at least a portion thereof movable along a multiplicity of paths within the sector shaped recess, and a magnet mounted on the base assembly adjacent the proximal ends of the side walls and having its axis coplanar with a bisector of the recess, the magnet magnetically holding the mass in engagement with the side walls of the recess adjacent the proximal ends thereof, an acceleration pulse of predetermined amplitude and time overcoming the magnetic attraction of the magnet and moving the mass toward the spring finger and into engagement therewith to close a circuit across a source of power connected to the mass and spring finger.

2. The combination recited in claim 1 wherein the housing includes an arcuate end wall at the distal end of the side walls, the engagement of the mass with the arcuate end wall limiting movement of the mass to less than that which would result in permanent deformation of the spring finger.

3. A sensor comprising, in combination, a housing, a base assembly located at the lower end of the housing and including angularly related side walls defining a sector shaped recess opening to the housing, means securing the housing and base assembly to each other, a contact member including at least one cantilever spring finger extending angularly to the recess intermediate the distal ends of the side walls, a resilient member extending through the housing, means mounting the resilient member adjacent the upper end thereof to the housing adjacent the upper end thereof, a cylindrical mass secured to the lower end of the resilient member and movable along a multiplicity of paths within the sector shaped recess, and a magnet mounted on the base assembly adjacent the proximal ends of the side walls and having its axis coplanar with a bisector of the recess, the magnetic attraction of the magnet holding the mass in tangential engagement with the side walls of the recess adjacent the proximal ends thereof, an acceleration pulse of predetermined amplitude and time overcoming the magnetic attraction of the magnet and moving the mass toward the spring finger and into engagement therewith to close a circuit across a source of power connected to the mass and spring finger.

4. The combination recited in claim 3 wherein the housing includes an outwardly flaring circular flange at its lower end seating the base assembly, the sensor including means clamping the flange of the housing to the base assembly to assemble the sensor.

5. The combination recited in claim 3 wherein the base assembly includes integral means radially spacing the magnet with respect to the mass and indexing the magnet with its axis coplanar with a bisector of the recess.

6. The combination recited in claim 3 wherein a cylindrical peripheral edge of the mass engages and deflects the spring finger, the resiliently deflectable member being deflected upon movement of the mass and cooperating with the spring finger in exerting a force on the mass returning the mass to normal position.

7. A sensor comprising, in combination, a vertical tubular housing, a base assembly at the lower end of the housing including angularly related side walls defining a sector shaped recess opening to the housing, a contact member including at least one resiliently deflectable spring finger extending angularly to the recess intermediate the distal ends of the side walls means indexing the housing, base assembly and contact member to each other, means securing the housing, base assembly, and contact member together in indexed relationship, a resiliently deflectable member extending through the housing, means mounting the resiliently deflectable member adjacent the upper end thereof to the housing adjacent the upper end thereof, a cylindrical mass secured to the lower end of the resiliently deflectable member and movable along a multiplicity of paths within the sector shaped recess, and a magnet mounted on the base assembly adjacent the proximal ends of the side walls and having its axis coplanar with a bisector of the recess, the magnet magnetically holding the mass in engagement with the side walls of the recess adjacent the proximal ends thereof, an acceleration pulse of predetermined amplitude and time overcoming the magnetic attraction of the magnet and moving the mass toward the spring finger, a peripheral edge of the mass engaging the spring finger to close a circuit across a source of power connected to the mass and spring finger, the resiliently deflectable member and spring finger each being resiliently deflected upon engagement thereof.

8. A sensor as recited in claim 7 wherein the base assembly includes means indexing the magnet with its axis coplanar with the bisector of the recess.

* * * * *